(12) United States Patent
Kalina et al.

(10) Patent No.: US 10,320,184 B2
(45) Date of Patent: Jun. 11, 2019

(54) METHOD AND MEANS FOR COMPLEX, UNIVERSAL EARTH FAULT PROTECTION IN POWER HIGH AND MEDIUM VOLTAGE SYSTEM

(71) Applicant: ABB TECHNOLOGY AG, Zurich (CH)

(72) Inventors: Emil Kalina, Brno (CZ); Vaclav Prokop, Modrice (CZ)

(73) Assignee: ABB SCHWEIZ AG, Baden (CH)

( * ) Notice: Subject to any disclaimer, the term of this patent is extended or adjusted under 35 U.S.C. 154(b) by 690 days.

(21) Appl. No.: 14/897,242

(22) PCT Filed: Jun. 5, 2014

(86) PCT No.: PCT/EP2014/001534
§ 371 (c)(1),
(2) Date: Dec. 10, 2015

(87) PCT Pub. No.: WO2014/198396
PCT Pub. Date: Dec. 18, 2014

(65) Prior Publication Data
US 2016/0134101 A1 May 12, 2016

(30) Foreign Application Priority Data
Jun. 10, 2013 (EP) .................................... 13002965

(51) Int. Cl.
*H02H 3/16* (2006.01)
*H02H 7/22* (2006.01)

(52) U.S. Cl.
CPC ............ *H02H 7/222* (2013.01); *H02H 3/165* (2013.01)

(58) Field of Classification Search
CPC ............. H02H 3/16; H02H 3/162; H02H 3/33
USPC ...................................................... 361/42–50
See application file for complete search history.

(56) References Cited

U.S. PATENT DOCUMENTS

| | | | |
|---|---|---|---|
| 2001/0029433 A1 | 10/2001 | Scott | |
| 2011/0043190 A1* | 2/2011 | Farr | ............... G01R 15/181 324/126 |
| 2011/0050154 A1* | 3/2011 | Farr | ................. H02H 3/006 318/778 |

FOREIGN PATENT DOCUMENTS

| | | |
|---|---|---|
| CN | 102590583 A | 7/2012 |
| CN | 202583423 U | 12/2012 |
| WO | WO 2004008600 A2 | 1/2004 |
| WO | WO 2012056287 A2 | 5/2012 |

* cited by examiner

Primary Examiner — Dharti H Patel
(74) Attorney, Agent, or Firm — Leydig, Voit & Mayer, Ltd.

(57) ABSTRACT

A method and apparatus for earth fault in power high and/or medium voltage system may enhance a protection system for special technical task, which is to measure residual current, the invention is, that for earth fault protection in power system or a part of power system, for example, but not limited to, cable connectors, wherein residual current is determined indirectly by the calculation from the phase current values, obtained from the output signals of Rogowski-coil based current sensors.

12 Claims, 9 Drawing Sheets

METHOD AND MEANS FOR COMPLEX, UNIVERSAL EARTH FAULT PROTECTION IN POWER HIGH AND MEDIUM VOLTAGE SYSTEM

CROSS-REFERENCE TO RELATED APPLICATIONS

This application is a U.S. national stage application under 35 U.S.C. § 371 of International Application No. PCT/EP2014/001534, filed on Jun. 5, 2014, and claims benefit to European Patent Application No. 13 002 965.5, filed on Jun. 10, 2013. The International Application was published in English on Dec. 18, 2014, as WO 2014/198396 A1 under PCT Article 21(2).

FIELD

The Invention relates to a method and means for earth fault in power high and/or medium voltage system.

BACKGROUND

Residual current detection is a key in earth-fault protection systems of power systems. There are two methods to detect the residual current. In the first method, core balance current transformer (CBCT) is used. The output of the transformer is is adequate to the residual current of the system below the CBCT in the direction of power flow. That part of the system, which is above the CBCT is not protected by use of that CBCT. This first method can be used in electrical network systems with low earth current, e.g. the compensated network. For use in the electrical network system with large earth current this method is expensive.

The second method of residual current detection uses the phase-current information from the instrument transformers. This information is then summed and the result is the residual current. This method can be used in electrical network systems with large earth current, e.g. resistor earthed network. It cannot be used in electrical network system with low earth current due to the sensitivity of current transformers.

SUMMARY

An aspect of the invention provides a method for universal earth fault protection in a high and/or medium voltage power system application using Rogowski-coils as current sensors, the method comprising: determining, for earth fault protection in an electrical system, a residual current value indirectly as a sum of phase currents determined from the output of a Rogowski coils based current sensor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
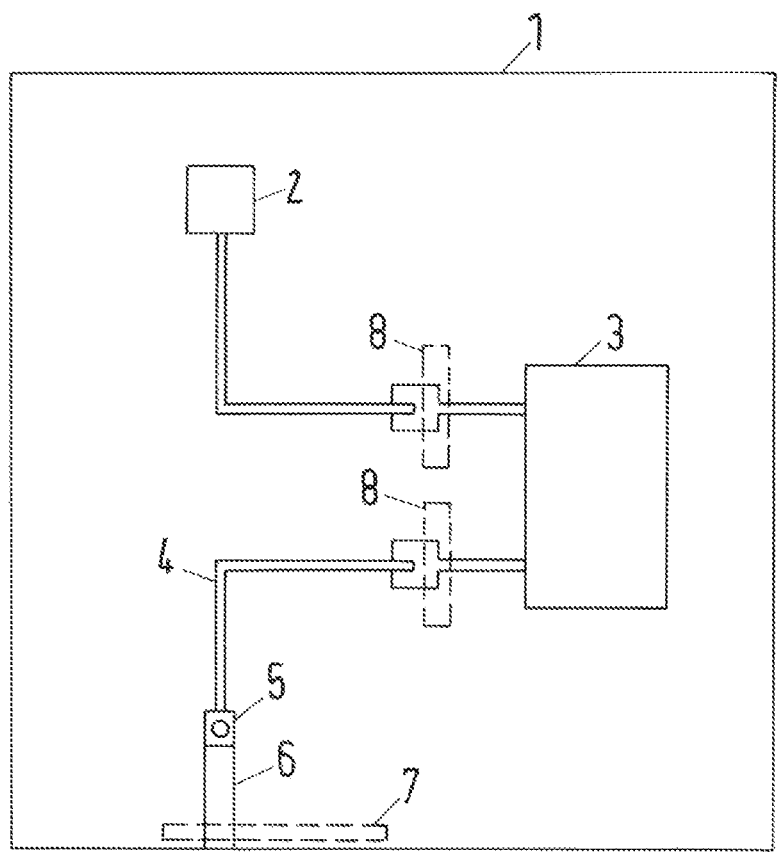
FIG. 1 shows an overview of the use of the sensor in a medium voltage switchgear.

An aspect of the invention provides a protection system for special technical task, which is to measure residual current.

An aspect of the invention provides for earth fault protection in electrical power system and/or the electrical power system part, for example, but not limited to, protection of the cable connectors, which residual current is determined indirectly by the calculation from the phase current values, obtained from the output signals of Rogowski-coil based current sensors.

An advantageous embodiment of the invention is, that the Rogowski coil based sensors transform the phase currents to voltage signals and the voltage outputs of the sensors is connected to a protection relay (IED) which digitalizes the voltage values which are then conditioned and then transformed to the value of the measured current, together with the actual phase of it.

A further advantageous step is that the residual current is then determined in the protection relay (IED) as vector sum of the phase current.

The value of the residual current is then compared to a preset level, and preset measures are taken to setting the alarm and/or switching off the circuit breaker and/or sending the information to the superior system level.

Optionally the residual current value can be displayed on a display of the protection relay (IED), to the operator, or send to a superior control system using digital network.

The sensitive detection of residual current is essential for EF protection, particularly in systems with a low level of earth fault currents. There are many methods for the detection of residual current. In compensated or small isolated systems, a core balanced (ring type) current transformer (CBCT) is typically used. Even though EF protection with a CBCT is widely used, the CBCT represents additional equipment which requires the engineering of its parameters as well as materials and other cost investments.

With the development of digital protection relays, residual current can be easily calculated as a vector sum of three phase currents. However, with traditional current transformers (CTs) this method has a significant drawback due to the limited accuracy caused by the limited size of the CTs. The inaccuracy of this measurement creates an apparent residual current which affects the EF protection function. Therefore, it is recommended to use the residual current calculated from phase CTs only in systems with high levels of earth fault currents.

Sensors, with their linear characteristics and no saturation, provide highly accurate measurements across the whole operating range. A typical example is the current sensor which can measure accurately phase currents from a few amps (A) up to tens of kilo-amps (kA). This means that the apparent residual current created by measurement inaccuracy can be very low and therefore there might not be limitation in using the calculated residual current from sensor phase current measurements in any system, even with extremely low levels of earth fault current.

Due to the absence of a ferromagnetic core the sensor has a linear response over a very wide primary current range, far exceeding the typical current transformer range. Thus, current sensing for both measurement and protection purposes could be realized with single secondary winding. In addition, one standard sensor can be used for a broad range of rated currents and is also capable of precisely transferring signals containing wide range of frequencies different from rated ones.

The typical example of a current sensor can reach the metering class 0.5 for continuous current measurement in the extended accuracy range from 5% of the rated primary current (e.g. 4 A) up to the rated continuous thermal current (e.g. 4000 A). For dynamic current measurement (for protection purposes), current sensors can fulfill the requirements of the protection class up to an impressive value reaching the rated short-time thermal current (e.g. 50 kA).

The zero phase current is calculated as vector sum of phase currents. Phase currents are determined from the digitalized values of the Rogowski coil sensor signals.

In a further advantageous embodiment, the method is used for generation of switch-off and/or earthing and/or short cutting, by sensitive earth fault protection in power systems.

By the use of Rogowski coils, the current sensor can be placed at each desired or important region of the power system, for example, but not limited to, inside the switchgear containment, because of its very compact measures. Furthermore Rogowski coils have the advantage in that use, that in absence of iron cores the saturation phenomena is eliminated and therefore dynamic measurement range grows substantially. Since Rogowski coil has linear characteristic, the very accurate measurement is provided in the whole operating range. Then it is possible, to measure reliably and accurate currents much smaller as well as much higher, then it could be possible by conventional current transforms with the same nominal current rating.

A panel with Rogowski coil based sensors, signal of whose is used for residual current calculation provides significant competitive advantage among other solutions. Residual current can be calculated precisely in wider range than with conventional transformers. High precision sensors can provide information accurate enough to be used in both low and large earth current electrical network systems.

In a further advantageous embodiment of the invention, a calculation algorithm for determination of the sensor signal value is implemented as an exchangeable software-program-product, which parameters are adjusted or adjustable to the specific use in the switchgear of other applications, in that way, that the calculation algorithm is transferable into the steering electronic via a data medium, or a data file send via browser.

This is significantly advantageous, because it concludes the small and compact dimensions of the inventive current sensor use, with an easy retrofit of each switchgear. So the current sensors can be retrofit, and in the same time the algorithm for their steering and implementation in the protection system can be easily be retrofit in then same way, by only easy implementation by transfer of algorithm data via data media or data file into the steering system of switchgear.

Earth fault protection system for switchgears itself, consist of at least one coreless Rogowski coil used for each of a three-phase current path, and that the rogowski coils are combined with protection relays in that way, that residual current of the feeders of the switchgear can be calculated, and in case of a residual current over the preset limit is detected, the earth fault protection is activated.

In a further advantageous embodiment of the invention, the rogowski coil is applied in a thin ringshaped sensor housing, and that the sensor housing has concentric outer ribs, in order to enlarge creepage path along the diameter of the sensor housing ring.

The advantage of the invention is, that the sensor is small enough to fit in the tight space in the circuit breaker compartment and it has such nominal ratio (80 A/150 mV), that it can measure the phase currents with accuracy good enough for sufficient I0 calculation.

Basic idea for this solution is, to use such sensors, in order to the lack of saturation phenomenon, with a very broad measuring range; in this case it can measure from 4 A to 4000 A. Protection of cable ends and connector is important as this is part of switchgear, which is prepared manually during the installation and as result of human error, damage to isolation and/or shield layers, or material impurity, failures occur relatively often there.

According to an earth fault protection system of the cable connectors in high and/or medium voltage switchgears, wherein Rogowski coils are used for current sensing, the invention is, that at least one coreless Rogowski coil is used for each of a three-phase current path, and that the rogowski coils are combined with protection relays in that way, that residual current of the feeders of the switchgear can be calculated, and in case of a residual current value reaches preset level, the earth fault protection is activated.

In a further very advantageous embodiment, the rogowski coil is applied in a thin ringshaped sensor housing, and that the sensor housing has concentric outer ribs, in order to enlarge creepage path along the diameter of the sensor housing ring.

The best placement for the coils is, that the rogowski coil or the rogowski coils are arranged between the ribs.

FIG. 1 shows an overview of a medium voltage switchgear panel 1. Inside is shown the busbar 2 and the circuit breaker 3, with higher and lower connection point or terminal. The sensors 8 are located and placed between the cable connector 4 and the connectors of the Circuit breaker 3. So because of the fact, that the rogowski coil sensors are small enough, they can be easily arranged there.

In the outgoing section are located the cable connector 5 and the outgoing cable 6 an finally the zero current measurement 7.

Figure 2:
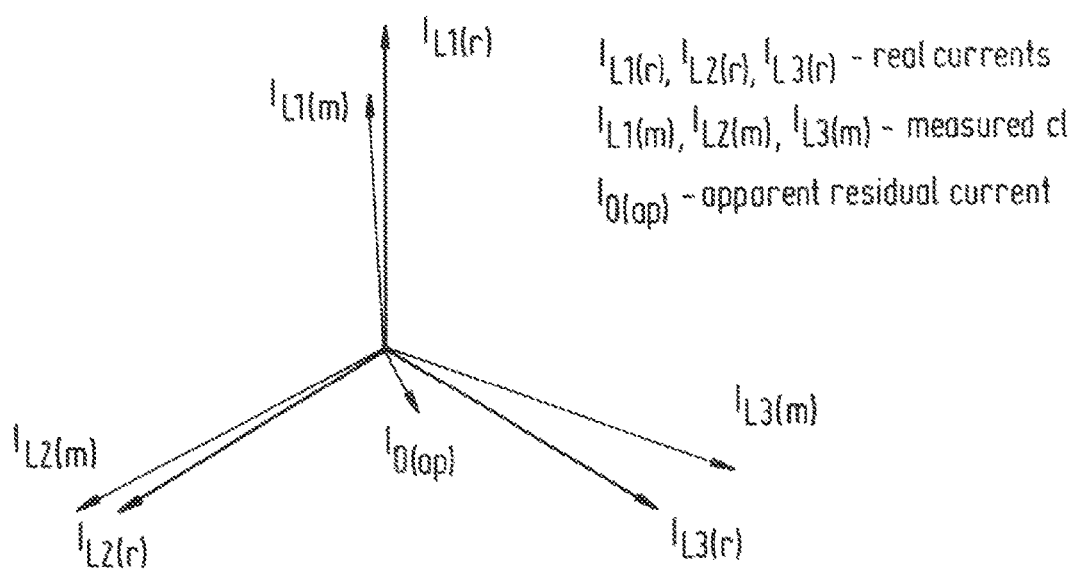
FIG. 2 shows the creation of apparent residual current.
Figure 3:
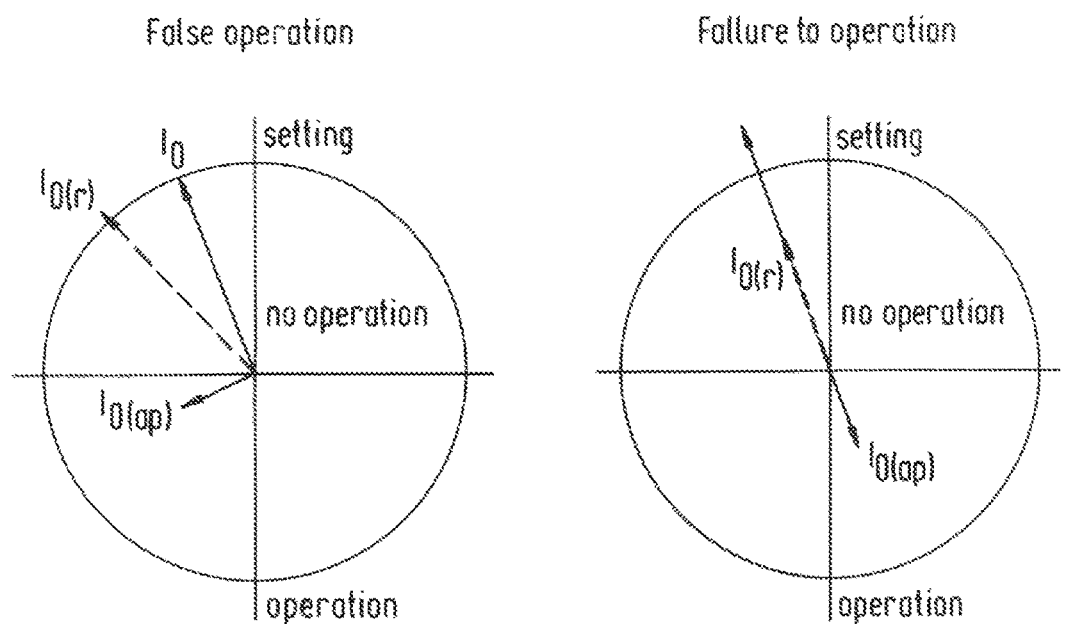
FIG. 3 shows the impact of apparent residual current on EF protection performance.

Modern microprocessor-based protection relays enable calculation of residual current as a vector sum of three phase currents. However there is a limitation for application in systems with low level of earth fault currents if conventional CTs are used for phase current measurements. Due to the measurement error of each CT, it is recommended to use calculated residual current like shown in FIGS. 2 and 3, only if the earth fault current is higher than 10% of nominal current. In other cases it is recommended to use CBCT. The recommendation assumes that CTs with protection accuracy class have been used and therefore limited accuracy of such class is considered with additional safety margin.

The amplitude and phase errors of the CTs distort measured phase currents. The Intelligent Electronic Device (IED) then sees the different phase currents than real phase currents in the network. Consequently apparent residual current is created due to measurement inaccuracy.

The level of apparent residual current is usually quite difficult to determine; moreover, this component could affect the correct function of the EF protection. If the apparent residual current is too high in relation to the earth fault current, it could cause malfunction of EF protection (false operation or failure to operation).

I0—real earth fault current in the network
I0(ap)—apparent residual current
I0(r)—earth fault current seen by IED On the other hand, if the measurement is very accurate in the whole operating range provided by the sensors, the apparent residual current could then be very low without significant impact on operation of EF protection.

The primary tests of EF protection based on calculated residual current in steady-state conditions were done to determine the level of the apparent residual current. The tests were done in a laboratory with the primary current source which supplied the 3-phase current in the range 0-2000 A to the three connected sensors. The testing system was connected as an isolated network (without any connection of neutral to the ground), therefore no real residual current could appear.

Consequently the trip of earth fault protection could cause only apparent residual current created by measurement inaccuracy. The level of apparent residual current was detected by a gradual increase of injected primary current (Ip) and by adjusting of EF protection start current. If the EF protection tripped, the apparent residual current was higher than EF protection start current I0(op). Then the setting of EF protection start current was increased by one step up to the value which did not cause the trip I0(inop). The primary current (Ip) was injected in the step 10 A in the range 20-1000 A and then in the step 25 A in the range 1000-2000 A.

Setting of the EF protection in REF615:
Nominal current: In=40 A
Start current: from 1% up to 3% of In
Time delay: 40 ms Ip-injected current set on the primary current source Is1, Is2, Is3—phase currents read from the IED I0(op) [%], [A]—start current of the EF protection in [%], [A] when IED tripped I0(inop) [%], [A]—start current of the EF protection in [%], [A] when IED did not trip Note: In Table 1 are mentioned only the values where was measured the changed of the apparent residual current.

The primary 3-phase current source was not able to provide exactly 120° phase shift between the phases. This fact resulted in different amplitude values of measured currents in three phases but did not have any impact on measurement accuracy, accuracy of calculated residual current, or EF protection performance since the vector sum of primary phase currents was zero all the time due to the connection of the equipment as an isolated system.

Figure 4:
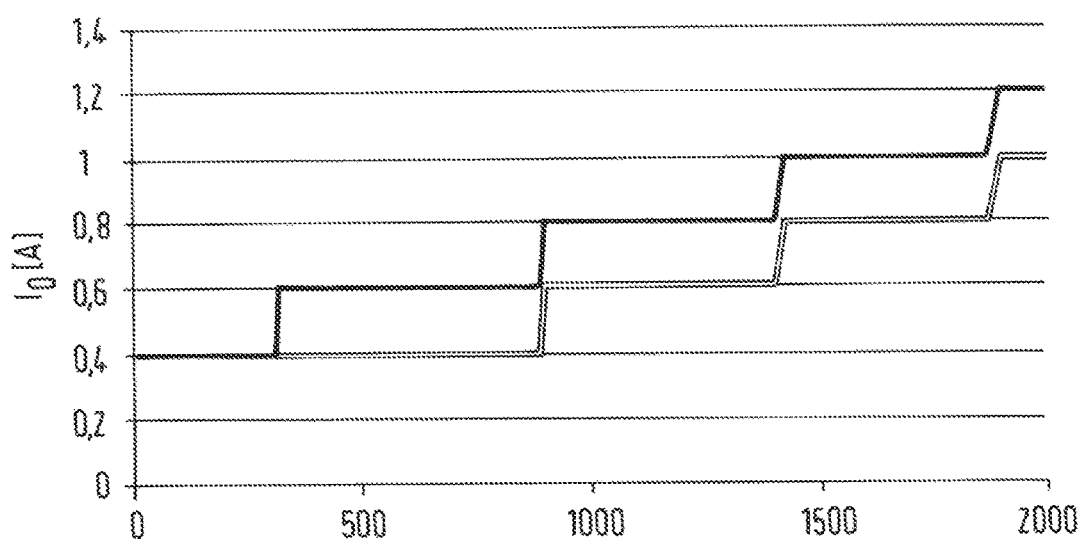
FIG. 4 shows the relationship between apparent residual current and injected primary current.

The upper curve (Inoperative) on FIG. 4 represents the characteristic when EF protection did not trip and the lower curve (Operative) represents the characteristic when EF protection was activated by apparent residual current and tripped. Consequently the amplitude of apparent residual current then reached the values between the blue and the red characteristics expressed by the grey zone. From the results it is evident that apparent residual current reached very acceptable values which proved the high accuracy of sensor measurement e.g. for injected current 2000 A was apparent residual current in the range 1-1.2 A.

The results of the test signified very promising precondition to decrease recommended setting of EF protection from 10% of nominal current to lower values if the calculated residual current from sensor measurement is used.

The primary tests of EF protection based on calculated residual current on the model of the network (supply voltage 230 V) were done to prove the behaviour in transient conditions and to verify the positive results from the previous test done in a laboratory in steady-state conditions.

The model of the network consisted of a supply step-up transformer, circuit breaker, transformer which enabled to create required type of network neutral grounding, and different types of burdens e.g. power transformer for stability test on inrush current or capacitors for earth fault tests.

Figure 5:
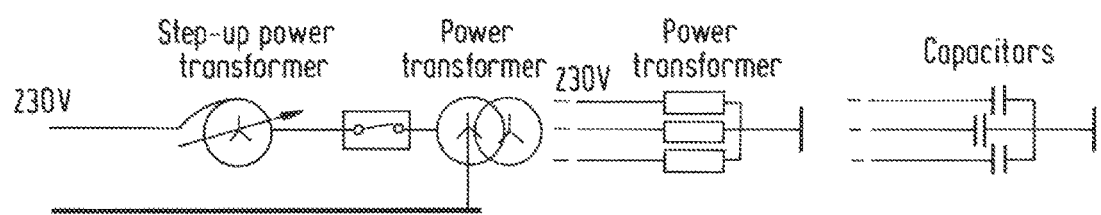
FIG. 5 shows a simplified scheme of network model.

230V 230V Power transformer Capacitors Step-up power transformer Power transformer FIG. 5 displays a simplified scheme of network model stability test on inrush current. Inrush current represents a problematic element for conventional CTs in case that CTs cannot be designed with appropriate parameters (mainly due to limited size or required low-rated primary current). During switching operation of a power transformer, inrush current could cause saturation of such CTs which would then initiate false trip of EF protection if calculated residual current is used. Therefore, this case was intentionally simulated with the IED RET615 connected to the CTs with very high secondary burden provided by connected resistors Rb=500Ω. The IED REF615 was connected to the combined sensors for phase current and phase voltage measurements. CBCT connected to the REF615 was used as a reference.

Figure 6:
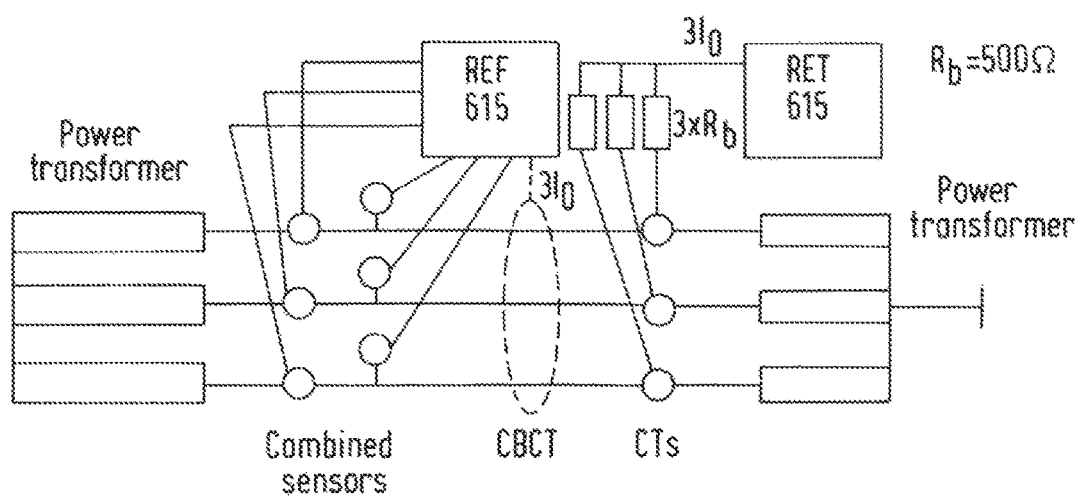
FIG. 6 shows a simplified scheme of connected equipment.
Figure 7:
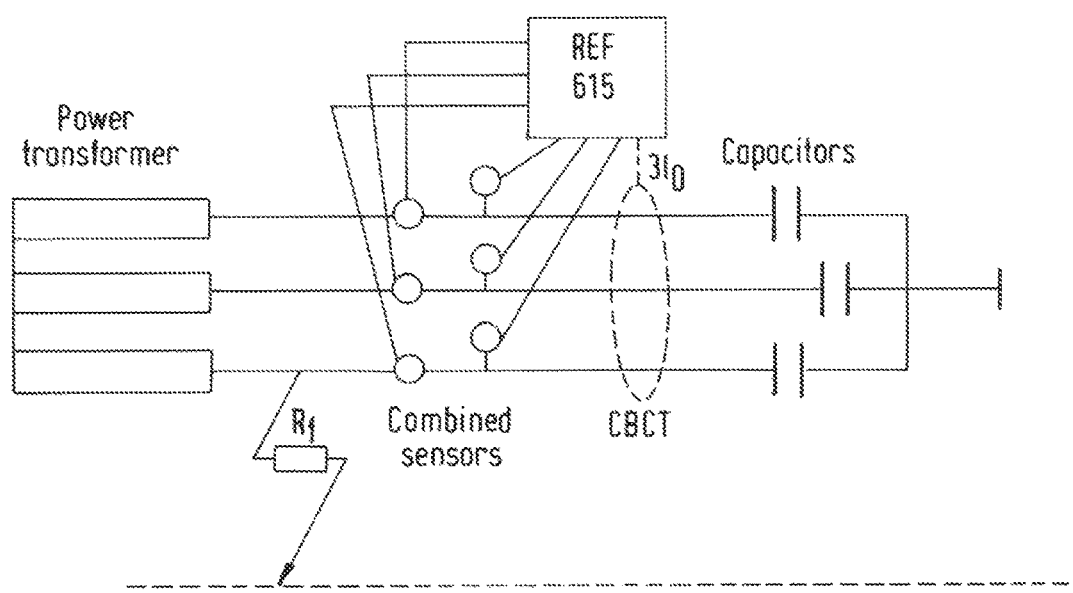
FIG. 7 shows a simplified scheme of connected equipment.

REF 615 RET 615 Power transformer 3×Rb 3I0 Combined sensors CBCT CTs 3I0 Rb=500Ω Power transformer FIG. 6 displays simplified scheme of connected equipment during the stability test. The EF protection (in REF615) based on calculated residual current from sensor measurements was set on the most sensitive (minimum) settings:
Nominal current: In=40 A
Start current: 1% of In
Time delay: 40 ms 25 tests were simulated to verify stability on inrush current without any false trip of EF protection based on calculated residual current from sensor measurement (in REF615). With the IED RET615 were simulated cases when CTs saturate due to inrush current during switching operation of a power transformer and consequently creates a false trip of the EF protection. Despite the fact that modern IEDs can detect inrush current and therefore avoid unwanted trip of EF protection, such functions are still not often used by users.

Testing of earth faults on the model of network with isolated neutral systems with isolated neutral could represent challenges for traditional detection of earth faults particularly in case of small networks where the level of residual current is very low. The purpose of the tests was to verify the behaviour of EF protection in isolated system with low level of earth fault current on the model of the network during transient conditions. The network capacitance was simulated by connected capacitors in all three phases. IED REF615 was connected to the combined sensors. CBCT was used as a reference for residual current measurement.

EF protection (in REF615), based on calculated residual current from sensor measurements, was set on the most sensitive (minimum) settings:
Nominal current: In=40 A
Start current: 1% of In
Time delay: 60 ms Three different types of the earth faults were simulated: solid earth faults, low and high impedance earth faults, and intermittent earth faults.

Considering solid earth faults in isolated network; During the simulation of solid earth faults, the phase L1 was connected to the ground. In total, six tests were done where correct detection of earth fault currents as well as proper directional function (forward and reverse) were verified.

The phase currents before the earth fault were approximately 0.5 A. The earth fault current was approximately 1.6 A during the tests and EF protection always detected this earth fault current correctly. Maximum amplitude deviation between calculated residual current (from 3-phase current sensor measurement) and directly measured residual current (by CBCT) was about 0.1 A. The deviation could be caused by apparent residual current on the side of calculated residual current but on the other side also accuracy of the reference CBCT could be limited due to measurement of such low currents.

Considering impedance earth faults in isolated network; During the simulation of impedance earth faults, the phase L1 was connected to the ground via resistors with following resistances: Rf=1.13Ω; 50Ω; 100Ω; 114Ω; 115Ω. In total, five tests were done with positive results and correct detection of earth faults. The earth fault currents were in the range from 1.6 A up to 0.7 A. Maximum amplitude deviation between calculated residual current (from 3-phase current sensor) and directly measured residual current (by CBCT) was again about 0.1 A.

Considering intermittent earth faults in isolated network; For simulation of intermittent earth faults, 5.4Ω and 250Ω rheostats were used. Intermittent EF were simulated by the moving of a pin on the backside of the rheostats where small arcs were created. In total, eleven tests were done where EF protection correctly operated during all these non-standard conditions.

Conclusively can be said: Medium Voltage (MV) sensors based on non-conventional principles represent an alternative way how to measure current and voltage for protection and monitoring purposes in MV systems. Due to their compact size, high level of standardization, negligible energy consumption, high reliability, and safety, many advantages for users and applications exist. Their linear characteristic and very accurate measurement in the whole operating range offer new possibilities in the protection schemes. One area where these benefits could be fully utilized is represented by application with EF protection.

The tests in steady state conditions and in transient conditions were performed in order to prove the concept of EF protection based on calculated residual current from sensor measurement.

The results of the tests signified very promising precondition to decrease recommended minimum setting of EF protection, based on calculated residual current from sensor measurement, to lower values than in case of calculated residual current from conventional CTs measurement. This would enable using calculated residual current also in the network with very low level of earth fault current e.g. compensated networks which will contribute to the material and cost savings, further simplify protection schemes, and increase reliability of protection system. The whole concept of EF protection based on calculated residual current from sensor measurement will be further verified with the field tests in the networks.

Figure 8:
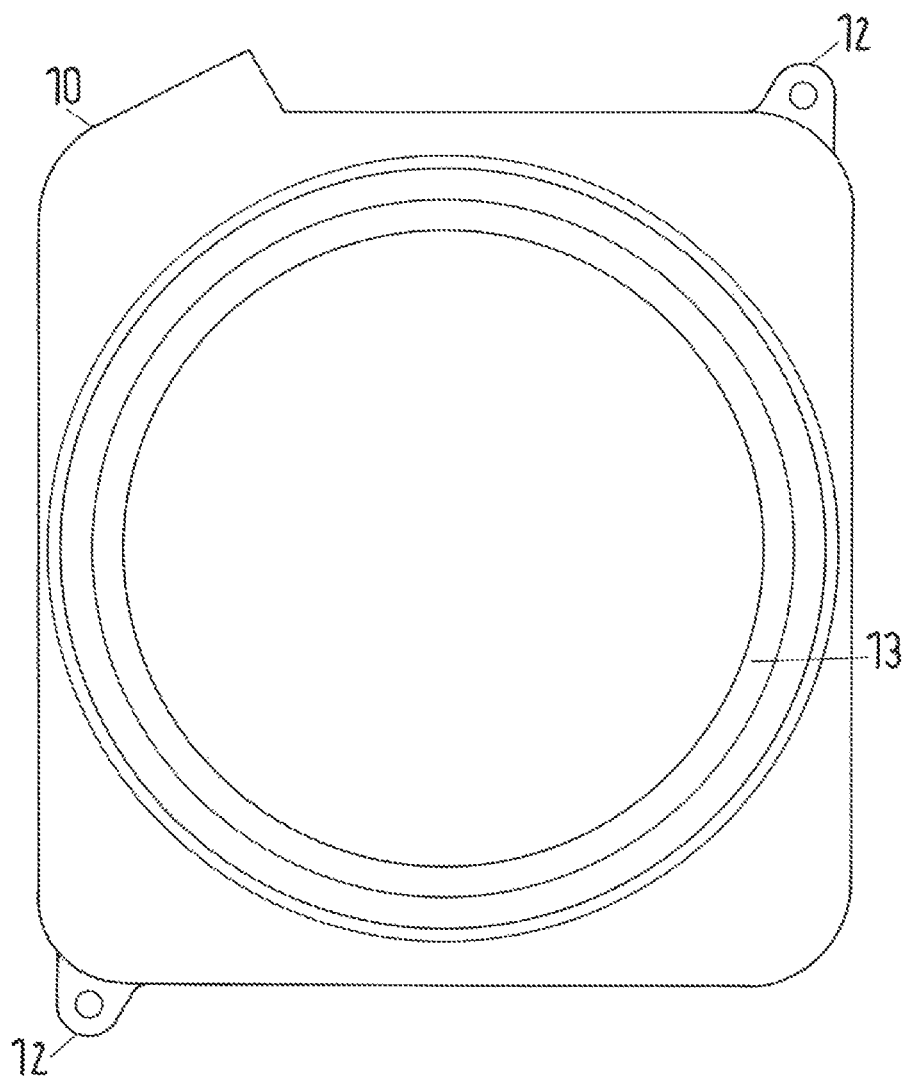
FIG. 8 shows a detail sensor housing in front view.

FIG. 8 shows a housing, in which the rogowski coil is arranged. The housing has two flange elements at the edges a fixation points. The housing has a round inner opening for the conductor. The periphery applied with concentric structures, in order to enlarge the creepage path parallel to the diameters direction.

Figure 9:
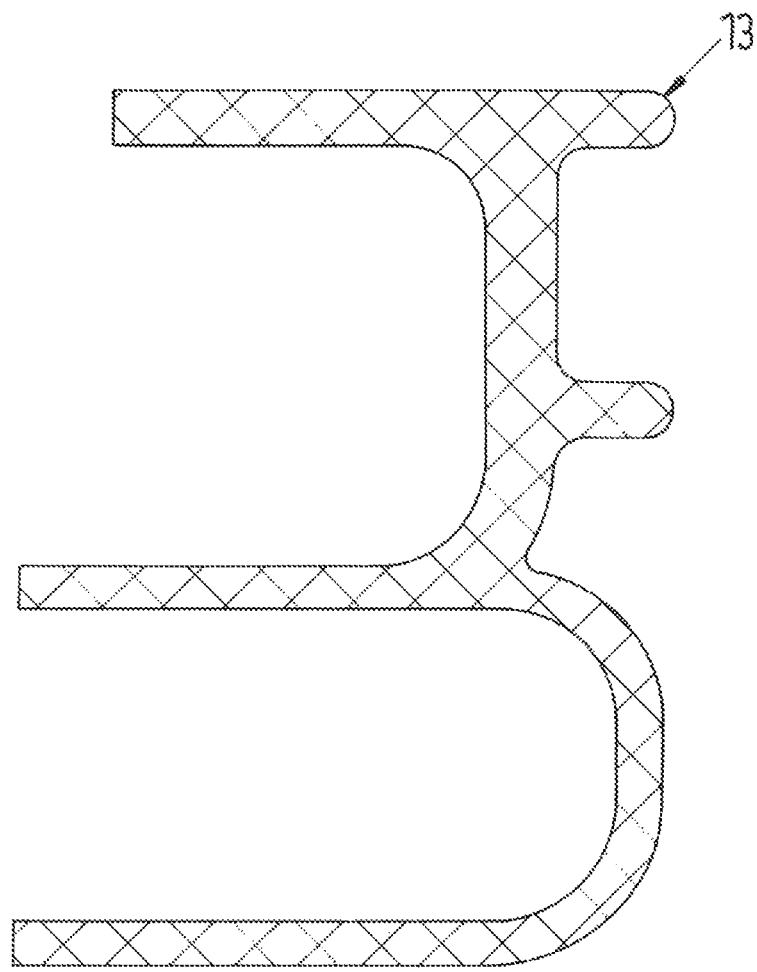
FIG. 9 shows a detail sensor housing in a cut view.

This detail is shown also in FIG. 9.

The cut along the diameter of the housing makes the enlargement of the creepage length visible. The inner surface of the housing is metalized to form grounded shielding, and the components forming the Rogowski coil are cast in that housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

POSITION NUMBERS

1 Switchgear panel
2 Busbars
3 Circuit breaker
4 Cable connection
5 Cable connector
6 Cable
7 Zero phase current measurement
8 Sensor position
10 Sensor housing
12 Fixation points
13 creepage length structures
14 rogowski coil

The invention claimed is:

1. A method for universal earth fault protection in a high and/or medium voltage electrical system application using Rogowski coils as current sensors, the method comprising:
   determining, for earth fault protection in the electrical system, a residual current value indirectly as a sum of phase currents determined from the output of a Rogowski coil based current sensor;
   transforming, using the sensor, the phase currents to voltage signals;
   connecting voltage outputs of the sensor to a protection relay (IED) which digitizes voltage values;
   conditioning and then transforming the voltage values to the measured current value, together with the actual phase of the current values; and
   determining the residual current value in a protection relay (IED) as a vector sum of the phase currents.

2. The method of claim 1, further comprising:
comparing the residual current value to a preset level; and
taking preset measures including setting an alarm and/or switching off a circuit breaker and/or sending information to a superior system level.

3. The method of claim 2, wherein the preset measures include setting the alarm.

4. The method of claim 2, wherein the preset measures include switching off the circuit breaker.

5. The method of claim 2, wherein the preset measures include sending the information to the superior system level.

6. The method of claim 1, further comprising:
displaying the residual current value on a display of the protection relay (IED), to an operator.

7. The method of claim 1, further comprising:
generating switch-off and/or grounding and/or short circuiting, using sensitive earth fault protection in switchgears.

8. The method of claim 1, further comprising:
implementing a calculation algorithm for determining the residual current value as an exchangeable software-program-product,
wherein parameters of the exchangeable software-program-product are adjusted or adjustable to a specific use in a switchgear of other applications, such that (i) the calculation algorithm is transferable into a steering electronic via a data medium, or (ii) a data file sent via browser.

9. The method of claim 1, further comprising:
sending the residual current value to a superior control system using a digital network.

10. An earth fault protection system for cable connectors in high and/or medium voltage switchgears, the system comprising:
a coreless Rogowski coil for each path of a three-phase current path, the coreless Rogowski coils being configured for current sensing,
wherein the coreless Rogowski coils are combined with protection relays such that residual current of feeders of the switchgear can be calculated, and, when a residual current value reaches a preset level, earth fault protection is activated,
wherein each coreless Rogowski coil is applied in a thin ringshaped sensor housing, and
wherein the sensor housing includes concentric outer ribs, allowing the sensor housing to enlarge a creepage path along a diameter of a sensor housing ring.

11. The system of claim 10, wherein, in each sensor housing, the coreless Rogowski coil is arranged between the ribs.

12. A method for universal earth fault protection in a high and/or medium voltage electrical system application using Rogowski coils as current sensors, the method comprising:
determining, for earth fault protection in the electrical system, a residual current value indirectly as a sum of phase currents determined from the output of a Rogowski coil based current sensor; and
implementing a calculation algorithm for determining the residual current value as an exchangeable software-program-product,
wherein parameters of the exchangeable software-program-product are adjusted or adjustable to a specific use in a switchgear of other applications, such that (i) the calculation algorithm is transferable into a steering electronic via a data medium, or (ii) a data file sent via browser.

* * * * *